US 8,589,694 B2

(12) United States Patent
Clark et al.

(10) Patent No.: US 8,589,694 B2
(45) Date of Patent: Nov. 19, 2013

(54) SYSTEM, METHOD, AND APPARATUS FOR GRADUATED DIFFICULTY OF HUMAN RESPONSE TESTS

(75) Inventors: Jason T Clark, Raleigh, NC (US); Ami H Dewar, Durham, NC (US); Robert C Leah, Cary, NC (US); Nicolas E Poore, Durham, NC (US); Peter C Yim, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 12/533,242

(22) Filed: Jul. 31, 2009

(65) Prior Publication Data
US 2011/0029781 A1 Feb. 3, 2011

(51) Int. Cl.
*H04K 1/00* (2006.01)
(52) U.S. Cl.
USPC ........... 713/182; 713/168; 713/170; 713/188; 726/2; 726/4; 726/6
(58) Field of Classification Search
USPC .......... 713/182–184, 168, 170, 188; 709/219, 709/225; 726/5, 6, 26, 2, 4
See application file for complete search history.

(56) References Cited

U.S. PATENT DOCUMENTS

| 7,197,646 B2 * | 3/2007 | Fritz et al. ..................... 713/182 |
| 7,200,576 B2 | 4/2007 | Steeves et al. |
| 7,533,419 B2 * | 5/2009 | Paya et al. ..................... 726/26 |
| 7,577,994 B1 * | 8/2009 | Sobel et al. ..................... 726/22 |
| 8,112,483 B1 * | 2/2012 | Emigh et al. ..................... 709/206 |
| 2002/0078198 A1 * | 6/2002 | Buchbinder et al. ........... 709/224 |
| 2007/0226804 A1 * | 9/2007 | Somkiran et al. ............... 726/24 |
| 2009/0055910 A1 * | 2/2009 | Lee .................................. 726/6 |
| 2009/0076965 A1 * | 3/2009 | Elson et al. ..................... 705/55 |
| 2009/0138723 A1 * | 5/2009 | Nyang et al. ................... 713/182 |
| 2009/0216842 A1 * | 8/2009 | Risher et al. ................... 709/206 |
| 2010/0077209 A1 * | 3/2010 | Broder et al. ................... 713/168 |
| 2010/0077210 A1 * | 3/2010 | Broder et al. ................... 713/168 |
| 2010/0082998 A1 * | 4/2010 | Kohavi ........................ 713/182 |
| 2010/0161927 A1 * | 6/2010 | Sprouse et al. ................. 711/163 |
| 2010/0228804 A1 * | 9/2010 | Dasgupta et al. .............. 707/915 |
| 2010/0325706 A1 * | 12/2010 | Hachey .............................. 726/6 |

OTHER PUBLICATIONS

Ahn et al. "reCAPTCHA: Human-Based Character Recognition view Web Security Measures" Science, vol. 321, No. 5895, (2008), pp. 1465-1468.

* cited by examiner

*Primary Examiner* — April Y Blair
*Assistant Examiner* — Joseph Pan
(74) *Attorney, Agent, or Firm* — Jeffrey T. Holman

(57) ABSTRACT

A server to implement human response tests of graduated difficulty can suppress access by spambots. The server includes a network interface and a test controller. The network interface connects the server to a network and facilitates electronic communications between the server and a client computer coupled to the network. The test controller is coupled to the network interface. The test controller implements a human response test with a level of difficulty on the client computer in response to an access request by the client computer. The level of difficulty of the human response test is dependent on a determination whether the access request is deemed to originate from a spambot.

19 Claims, 5 Drawing Sheets

| IMAGE_1 | DIFFICULTY_1 |
| IMAGE_2 | DIFFICULTY_2 |
| ⋮ | ⋮ |
| IMAGE_N | DIFFICULTY_N |

| SOURCE ID_1 | TIMESTAMP_1 |
| SOURCE ID_2 | TIMESTAMP_2 |
| ⋮ | ⋮ |
| SOURCE ID_N | TIMESTAMP_N |

SYSTEM, METHOD, AND APPARATUS FOR GRADUATED DIFFICULTY OF HUMAN RESPONSE TESTS

BACKGROUND

Spam is a common term for unsolicited and abusive electronic communications that are indiscriminately broadcast to recipients. Spam can quickly overtake email inboxes, online guest books, forums, submission forms, and other similar electronic communication forums. One reason that spam is so prevalent is that many people who send spam employ internet robots (also referred to as bots or spambots) that are software applications to run automated tasks for collecting recipient information (e.g., email addresses or forum submission websites) and sending or posting spam content to those recipients. In another example, spambots may automatically sign up for available email addresses, which can then be used to send spam to other recipients.

In order to curtail or limit the amount of spam that can be posted to these forums, some sort of logical gatekeeper is typically employed to try to prevent the spambots from automatically accessing recipient information and/or posting spam. One common type of logical gatekeeper process is known as CAPTCHA, which stands for Completely Automated Public Turing test to tell Computers and Humans Apart. In essence, a CAPTCHA test requires a response that presumably cannot be generated by a computer. One common type of CAPTCHA test displays distorted letters which may be read by a human user, but are difficult for a computer to decipher. Hence, a correct response to the CAPTCHA test is assumed to be from a human, rather than a computer.

However, computer programmers have found ways to improve the success rate of computer responses to CAPTCHA tests. Consequently, spamming mechanisms are able to employ more sophisticated response techniques to bypass or obtain access through conventional CAPTCHA testing processes.

In order to compensate for the increased abilities of computer programs to deal with CAPTCHA tests, the words, codes, or images used in the CAPTCHA tests are getting more and more distorted and difficult to determine, regardless of whether the user is a human or a spambot. Unfortunately, arbitrarily increasing the difficulty of CAPTCHA tests results in usability issues which frustrate and sometimes prevent legitimate use by actual human users.

SUMMARY

Embodiments of a computer program product are described. In one embodiment, the computer program product includes a computer usable storage medium to store a computer readable program for implementing graduated difficulty for a human response test to differentiate between a human response and a computer response. The computer readable program, when executed on a computer, causes the computer to perform operations. The operations include initiating a first human response test with a designated level of difficulty at a source computing device in response to a first test request. The first test request is associated with a first source identifier to identify at least one characteristic of the source computing device. The operations also include recognizing a second test request subsequent to the first test request. The second test request is associated with a second source identifier. The operations also include initiating a second human response test in response to the second test request. The second human response test has a level of difficulty which is dependent on a determination whether the first and second source identifiers correspond to the same source computing device. Other embodiments of the computer program product are also described.

Embodiments of a server are also described. In one embodiment, the server implements human response tests of graduated difficulty in order to suppress access by spambots. The server includes a network interface and a test controller. The network interface connects the server to a network and facilitates electronic communications between the server and a client computer coupled to the network. The test controller is coupled to the network interface. The test controller implements a human response test with a level of difficulty on the client computer in response to an access request by the client computer. The level of difficulty of the human response test is dependent on a determination whether the access request is deemed to originate from a spambot. Other embodiments of the server are also described.

Embodiments of a method are also described. In one embodiment, the method is a method for implementing graduated test difficulty within a data access system. The method includes initiating a first human response test with a designated level of difficulty at a source computing device in response to a first test request. The source computing device is identifiable by at least one source characteristic. The method also includes recognizing a second test request from the same source computing device based on identification of the source characteristic. The method also includes selecting a second human response test having an increased level of difficulty relative to the level of difficulty of the first human response test in response to recognizing the second test request is from the same source computing device. The method also includes implementing the second human response test having the increased level of difficulty at the same source computing device. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
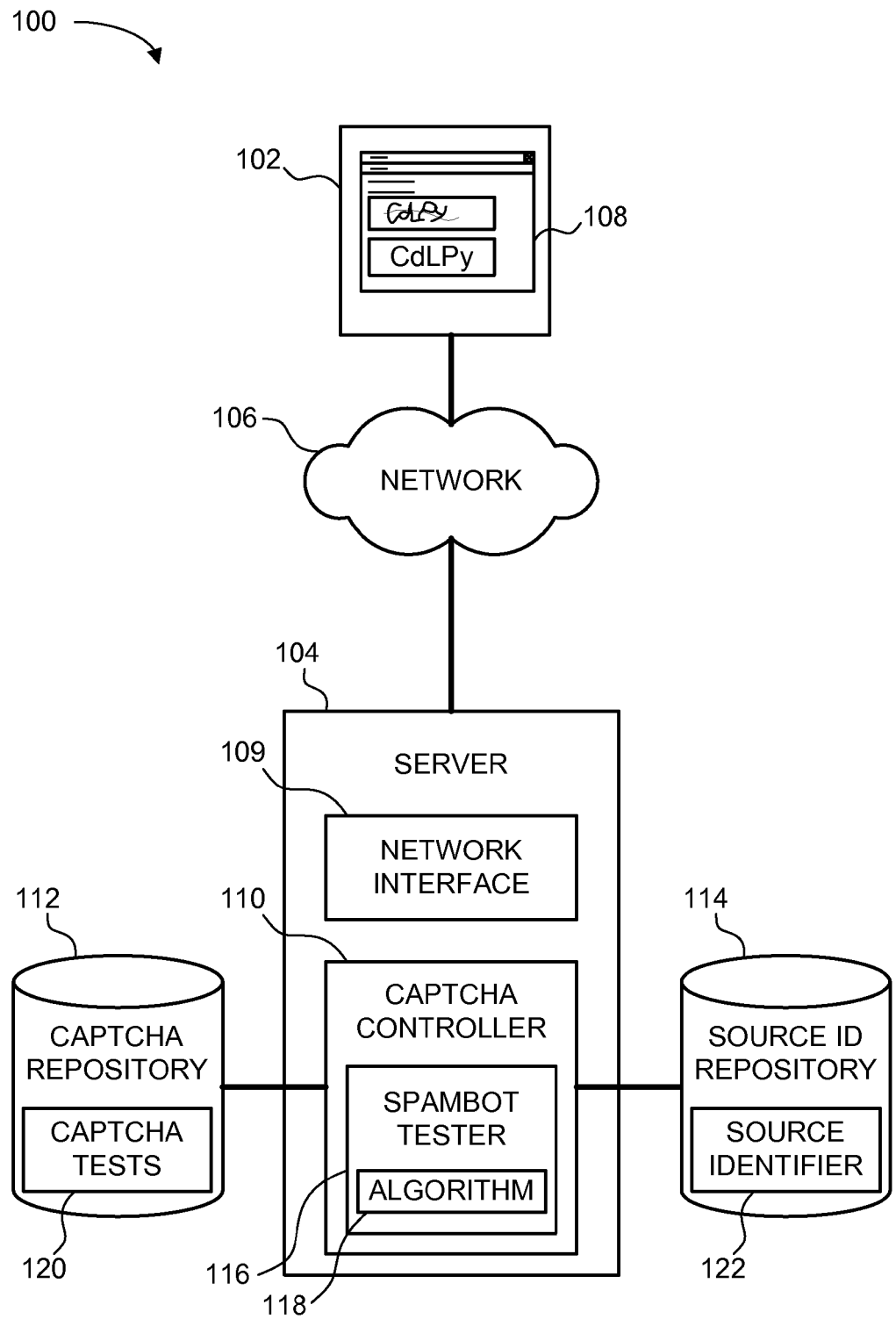
FIG. 1 depicts a schematic block diagram of one embodiment of a data access system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated. The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments relate to a system and method for implementing graduated difficulty for a human response test to differentiate between a human response and a computer response. The graduated difficulty can depend on a variety of factors. In one embodiment, the level of difficulty of human response tests administered to a user systematically increases in response to a determination that the user requesting access is a spambot.

For reference, the embodiments described herein may use any of a variety of human response tests. One type of human response test is a CAPTCHA test, in which a user is presented with a logical test that should be difficult for a computer to successfully resolve. For convenience, the description herein refers to several CAPTCHA embodiments. However, it should be understood that the references to specific CAPTCHA embodiments are merely representative of more general embodiments which administer human response tests to differentiate between responses from computers and actual human users.

One indicator that the user may be a spambot is repeated access from a single source computing device. A spambot generally will ping or request data access over and over again from the same computer in an attempt to deliver many spam responses or obtain many email addresses. In contrast, a human user will generally only provide one successful response, or complete a questionnaire or form once, because there is typically no need for a real person to repeatedly fill out and submit the same form over and over again.

Another indicator that the user may be a spambot relates to the timing between access requests. A spambot is typically set up to request access as many times and as quickly as possible in order to maximize the amount of access that is obtained. Hence, spambots typically request access over and over again with as little time in between requests as possible. Alternatively, some spambots may request access on a regular basis (e.g., every 30 seconds). In either case, the timing of the access requests can be used as a factor, either alone or in combination with other factors, to determine whether certain requests originate from spambots or actual human users.

Many online messaging interfaces and/or registration forms include security mechanisms to limit spambot access, in order to prevent an application from getting inundated with numerous spambot hits. In one embodiment, an improved CAPTCHA system can be implemented to recognize spambot factors and to systematically increase the level of difficulty for users that are thought to be spambots. As one example of the embodiments described herein, a first CAPTCHA test that is relatively easy for a user to decipher may be implemented. By making the initial request relatively easy, a human user is not necessarily frustrated or defeated by the initial access request. After a successful CAPTCHA response is submitted, if there is a detection of a subsequent request coming from the same computer within a specified period of time, then the request can be flagged as a spambot request. The identity of the computer can be tracked, for example, by using the internet protocol (IP) address of the computer or another unique characteristic of the requesting computer. Once the user is flagged as a spambot, the CAPTCHA tests can be made more and more difficult with each subsequent request. By increasing the difficulty of consecutive CAPTCHA tests, a spambot may be defeated by increasing the level of difficulty beyond the capabilities of the spambot to decipher and successfully respond to the CAPTCHA tests.

While each embodiment described herein may have unique functionality and advantages over conventional technology and/or other embodiments described herein, at least some of the embodiments provide a solution to defeat spambots that is more user friendly than arbitrarily increasing the difficulty of all access requests. Additionally, some embodiments provide improved security by suppressing repeated access by spambots. Also, some embodiments diminish the need for constant moderation of message boards, comment posts, and similar conventional targets of spambot attacks. Other embodiments may exhibit further functionality and advantages.

For convenience, the CAPTCHA tests referred to herein generally relate to CAPTCHA images that contain distorted letters, words, or codes. However, embodiments of the systems and methods described herein may be implemented with other types of CAPTCHA tests, or other human response tests, that do not necessarily rely on a visual decipher of letters, words, or codes.

FIG. 1 depicts a schematic block diagram of one embodiment of a data access system 100. In general, the illustrated data access system 100 includes a client computer 102, a server 104, and a network 106. Although the data access system 100 is shown and described with certain components and functionality, other embodiments of the data access system 100 may include fewer or more components to implement less or more functionality.

In one embodiment, the client computer 102 and the server 104 are operably couple to communicate with each other via the network 106. The network 106 may be an intranet, the internet, a local area network (LAN), a wide area network (WAN), a cellular network, or another type of network, or a combination of different types of networks. Although the client computer 102 and the server 104 are identified herein as specific nodes coupled to the network 106, the client computer 102 and the server 104 may be coupled to each other in another manner that facilitates electronic communications between the client computer 102 and the server 104.

The illustrated client computer 102 implements a browser interface 108 such as a typical internet browser interface. The browser interface 108 allows a user of the client computer 102 to potentially access data at the server 104 or at another location accessible via the network 106. For security purposes, some types of data access operations implement security protocols. For example, some types of data access operations require a user to be authenticated or to use encrypted data communications. As another example, some types of data access operations require a user to be validated as a real person to limit data access by a spambot. Typically, upon validation of the user as a real person, the server 104 allows the client computer 102 to access certain data. The accessed data may be located on the server 104 or on another device (not shown) coupled to the network 106. Alternatively, instead of accessing particular data located a node coupled to the network 106, other embodiments may facilitate granting other access privileges to the client computer 102.

The illustrated server 104 includes a network interface 109 and a CAPTCHA controller 110. In generally, the network interface 109 is a physical communication interface between the server 104 and other devices coupled to the network 106. The network interface 109 may be any type of network interface card (NIC) or other suitable physical interface device.

In one embodiment, the CAPTCHA controller 110 facilitates implementation of a CAPTCHA validation process in which the user of the client computer 102 is required to provide a response to a CAPTCHA test that is designed to be solvable by humans but not by automated computers or spambots. In a more general embodiment, the CAPTCHA controller 110 may be referred to as a test controller to administer human response tests, generally. As one example, the CAPTCHA controller 110 may coordinate with the client computer 102 to implement the illustrated CAPTCHA test in the form of distorted letters within the browser interface 108 of the client computer 102. The illustrated browser interface 108 also includes a sample typewritten CAPTCHA response, "CdLPy."

The depicted CAPTCHA controller 110 is coupled to a CAPTCHA repository 112 and a source identification repository 114. Although shown as separate repositories, some embodiments of the CAPTCHA repository 112 and the source identification repository 114 may be implemented on a single repository or, in the alternative, similar types of data from either repository may be distributed among several storage locations on different repositories.

Figure 3:
FIG. 3 depicts a schematic diagram of one embodiment of the CAPTCHA test database stored in the CAPTCHA repository of the data access system of FIG. 1.

In general, the CAPTCHA repository 112 stores a plurality of CAPTCHA tests 120, for example, in the form of a database structure or in another storage configuration. In a more general embodiment, the CAPTCHA repository 112 may be referred to as a test repository for storing human response tests. The CAPTCHA tests 120 may be any types of tests, including images, text, multimedia content, and so forth. For convenience, examples of CAPTCHA image tests are referenced herein. One example of a data structure for the CAPTCHA tests 120 is shown in FIG. 3 and described in more detail below.

Figure 4:
FIG. 4 depicts a schematic diagram of one embodiment of the source identifier database stored in the source identifier repository of the data access system of FIG. 1.

The source identification repository 114 stores a plurality of source identifiers 122 which uniquely identify client computers 102 that request a CAPTCHA test from the server 104. The source identifiers 122 stored in the source identification repository 114 may be any type of source identification or characteristic. Some examples of potential source characteristics include, but are not limited to, an internet protocol (IP) address, a media access control (MAC) address, a unique username, and so forth. Other examples of potential source characteristics include browser identifiers such as JavaScript navigator objects including, but not limited to, appName, appCodeName, userAgent, appVersion, and so forth. Other types or equivalents of navigator objects (e.g., platform, oscpu ref, etc.) may be used in other embodiments. One example of a data structure for the source identifiers 122 is shown in FIG. 4 and described in more detail below.

The CAPTCHA controller 110 includes a spambot tester 116. In general, the spambot tester 116 implements functionality to test whether the access request from the client computer 102 is from a real person or a spambot. Although it is unlikely that the spambot tester 116 might achieve 100% accuracy in its determinations, the accuracy may be very high, depending on the type of testing criteria used by the spambot tester 116.

In one embodiment, the spambot tester 116 implements an algorithm 118 to take into consideration one or more of the testing criteria. The algorithm 118 may be stored on an electronic memory device that is internal to the server 104 (e.g., a random access memory (RAM) device). Alternatively, the algorithm 118 may be stored in another location that is accessible by the spambot tester 116.

The algorithm 118 can take various forms to consider various testing criteria. Some examples of testing criteria include, but are not limited to, unique source identifiers such as IP or MAC address, time durations between access requests, time durations between an access request and an access response, accuracy rate of a sequence of responses, as well as other testing criteria. As one example of the access request time criterion, the spambot tester 116 may identify an access request as being from a spambot if time duration between access requests is more consistent (e.g., occurring on a regular basis every 10 seconds) than the anticipated randomness of a real person. As another example of the access request time criterion, the spambot tester 116 may identify an access request as being from a spambot if time duration between access requests is considered to be faster (e.g., 3.4 seconds between consecutive access requests) than would be anticipated from a real person. As one example of the response time criterion, the spambot tester 116 may identify an access request as being from a spambot if time duration between an access request and a corresponding response is considered to be faster (e.g., 2.1 seconds between the access request and the corresponding response) than would be anticipated from a real person. Some embodiments may use a single criterion to determine whether the access request originates from a real person or a spambot, while other embodiments may use a combination of testing criteria. The following pseudocode is one example of an implementation of the algorithm 118 (using thresholds Th1, Th2, and Th3) that may be used by the spambot tester 116 to determine if an access request

```
If:
    (Source_ID = Previous_Source_ID AND
        Request_Time_Lapse < Th1); OR
    Request_Time_Lapse < Th2; OR
    Request_Consistency = TRUE; OR
    Response_Time_Lapse < Th3;
Then:
    Source_ID_Flag = TRUE   //Identifies the Source_ID as a spambot
```

In this example of the algorithm 118, the source identifier associated with the requesting user is identified as a spambot if any of the four criteria are met. The first criterion determines if the source identifier is the same as a source identifier from a previous request within a specified time duration, Th1. The second criterion determines whether the time between access requests is faster than a specified threshold, Th2. The third criterion determines whether the time between access requests is more consistent than anticipated from a human user. The fourth criterion determines whether the response time is faster than a specified threshold, Th3. If any of these criteria are met, then the source identifier associated with the access request is identified as being from a spambot. Otherwise, a default status may be maintained to indicate that the source identifier is presumed to be associated with a real person. While the foregoing example presents one possible way of identifying a spambot, other embodiments of the spambot tester 116 may use other algorithms 118 with the same or different criteria.

Once the spambot tester 116 identifies an access request as being from a spambot, rather than from a real person, the spambot tester 116 communicates information to the CAPTCHA controller 110 to identify the corresponding client computer 102. Subsequently, the CAPTCHA controller 110 can begin to increase the difficulty of the CAPTCHA tests which are presented to the user at the identified client computer 102. In this way, the CAPTCHA controller 110 can implement graduated CAPTCHA difficulty in response to identification of a client computer 102 that is presumably operated by a spambot, rather than a real person.

Figure 2:
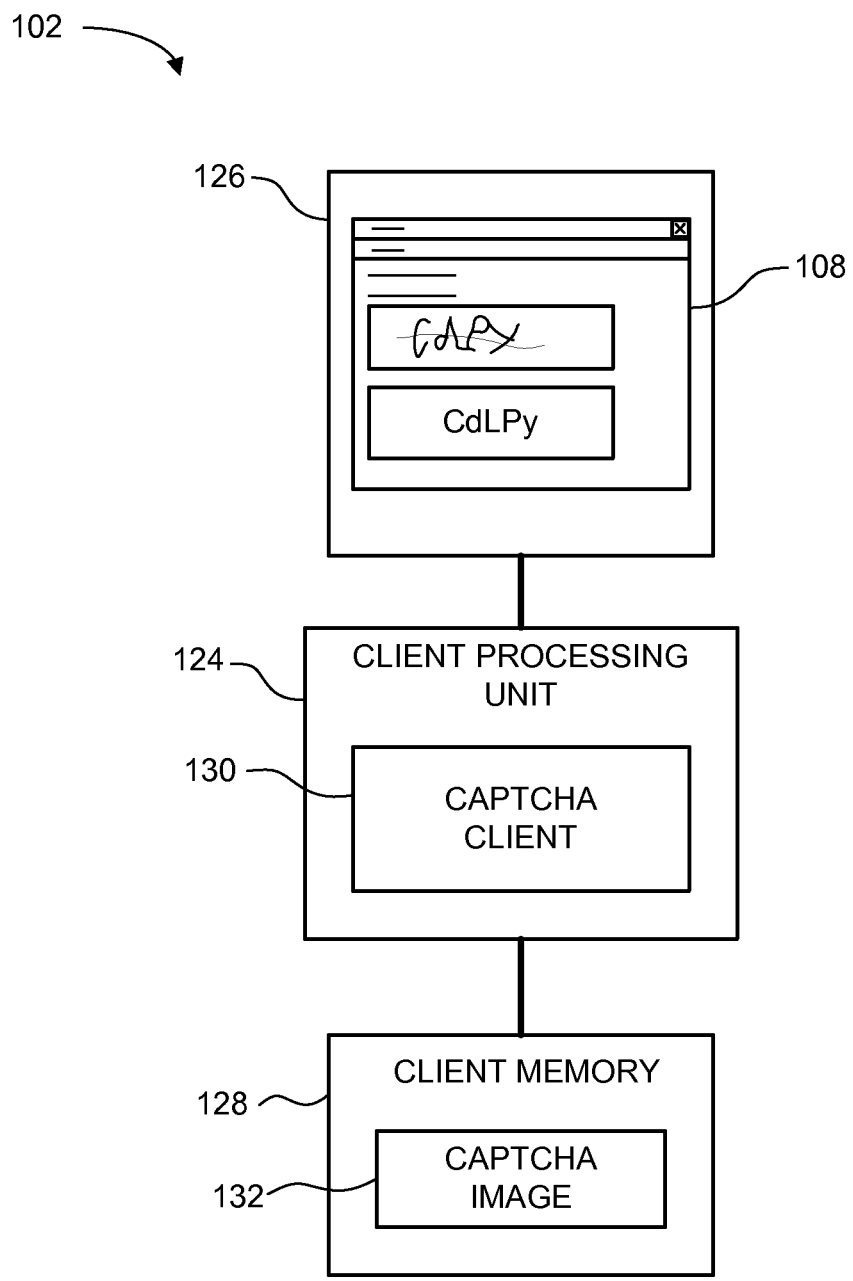
FIG. 2 depicts a schematic block diagram of one embodiment of the client computer from the data access system of FIG. 1.

FIG. 2 depicts a schematic block diagram of one embodiment of the client computer 102 from the data access system 100 of FIG. 1. The illustrated client computer 102 includes a client processing unit 124, a display device 126, and a client memory device 128. The client processing unit 124 further includes a CAPTCHA client 130. Also, the client memory device 128 stores one or more CAPTCHA images 132 (or other CAPTCHA test information), at least on a temporary basis. In a more general embodiment, the CAPTCHA client 130 may be referred to as a test client, and the client memory device 128 stores human response tests, generally. Although the client computer 102 is shown and described with certain components and functionality, other embodiments of the client computer 102 may include fewer or more components to implement less or more functionality.

In one embodiment, the display device 126 may be any type of graphical display such as a cathode ray tube (CRT) monitor, a liquid crystal display (LCD) monitor, or another type of display device. In some embodiments, the display device 126 displays the browser interface 108 that is implemented via the CAPTCHA client 130 which runs on the client processing unit 124. In general, the CAPTCHA client 130 facilitates a CAPTCHA test, or session, on the client computer 102. In some embodiments, the CAPTCHA client 130 allows a user to submit an access request to the CAPTCHA controller 110 on the server 104, participate in a CAPTCHA test administered by the CAPTCHA controller 110, and access data or other information in response to a successful response to the CAPTCHA test.

The client memory device 128 may store one or more CAPTCHA images 132, or other testing data (e.g., audio, text, applets, etc.), which are presented to the user via the CAPTCHA client 130 under the control of the CAPTCHA controller 110 on the server 104. The client memory device 128 also may store other data or instructions (e.g., program instructions) which may be referenced or invoked by the CAPTCHA client 130 during administration of a CAPTCHA test to the user.

FIG. 3 depicts a schematic diagram of one embodiment of the CAPTCHA test database 120 stored in the CAPTCHA repository 112 of the data access system 100 of FIG. 1. Although the CAPTCHA test database 120 is shown with a particular data structure, including specific data fields in a specific order, other embodiments of the CAPTCHA test database 120 may be implemented with fewer or more data fields, different data fields, and/or in a different order that that which is illustrated.

In the depicted embodiment, the CAPTCHA test database 120 includes a plurality of images (or other equivalent CAPTCHA test data) and corresponding difficulty indicators. For reference, the images are designated as IMAGE_1, IMAGE_2, ..., and IMAGE_N, and the difficulty indicators are designated as DIFFICULTY_1, DIFFICULTY_2, ..., DIFFICULTY_N. In some embodiments, the database structure 120 includes the actual images corresponding to the CAPTCHA tests. Alternatively, the database structure 120 may include memory addresses to indicate the location of the images, which may be stored locally on the client memory device 128 of the client computer 102, on the CAPTCHA repository 112 coupled to the server 104, or on another electronic memory device.

In one embodiment, the difficulty indicators indicate a level of difficulty of the corresponding CAPTCHA images or tests. There is no limit on the number of levels of difficulty that may be implemented, although a practical implementation may include between about three to ten different levels of difficulty. As one example, the difficulty indicators may be numerical indicators (e.g., 1 through 10) or other alphanumeric characters (e.g., A-E). Alternatively, the difficulty indicators may be more complex elements of a set of difficulty rankings.

By associating different levels of difficulty with each CAPTCHA image or test, the CAPTCHA controller 110 on the server 104 can initiate CAPTCHA tests with different levels of difficulty on the client computer 102 via the CAPTCHA client 130. In this way, the CAPTCHA controller 110 can systematically increase, decrease, or otherwise control the levels of difficulty of the CAPTCHA tests presented to each user depending, for example, on whether the user is identified as a real person or a spambot.

FIG. 4 depicts a schematic diagram of one embodiment of the source identifier database 122 stored in the source identifier repository 114 of the data access system 100 of FIG. 1. Although the source identifier database 122 is shown with a particular data structure, including specific data fields in a specific order, other embodiments of the source identifier database 122 may be implemented with fewer or more data fields, different data fields, and/or in a different order that that which is illustrated.

In the depicted embodiment, the source identifier database 122 includes a plurality of source identifiers and corresponding timestamp indicators. For reference, the source identifiers are designated as SOURCE ID_1, SOURCE ID_2, ..., and SOURCE ID_N, and the timestamp indicators are designated as TIMESTAMP_1, TIMESTAMP_2, ..., TIMESTAMP_N. As with the CAPTCHA test database 120 described above, the source identifier database structure 122 may include the actual source identifiers or, alternatively, memory addresses to indicate the location of the source identifiers, which may be stored on the CAPTCHA repository 112 coupled to the server 104 or on another electronic memory device.

In one embodiment, the CAPTCHA controller 110 stores one or more source identifiers for each client computer 102 that sends an access request to the server 104. The CAPTCHA controller 110 also stores one or more corresponding timestamps to record the time that the access request is generated by the client computer 102 or received by the server 104 and/or the time that the corresponding CAPTCHA response is generated by the client computer 102 or received by the server 104. Other embodiments may use timestamps related to different communication events. In some embodiments, multiple timestamps may be stored.

By storing source identifiers and corresponding timestamps in this manner, the CAPTCHA controller 110 may track the history of access requests for a specific client computer 102, or for all client computers, and use that historical data to determine whether the user at a given client computer 102 might be a spambot. As one example, the CAPTCHA controller 110 may invoke the spambot tester 116 to run the algorithm 118 and determine the frequency of access requests from the same client computer 102. If the access requests from a single client computer 102 are more frequent than a threshold time duration (e.g., more than one request every 30 seconds), then the spambot tester 116 may determine that the identified client computer 102 is a spambot and, hence, should be issued more difficult CAPTCHA tests. The CAPTCHA controller 110 may continue to issue CAPTCHA tests that have an increased level of difficulty for a given amount of time, for a specified number of unsuccessful attempts, or based on some other user-defined condition(s).

In another embodiment, the CAPTCHA controller 110 ultimately may determine that the identified client computer 102 should be denied access, regardless of the success rate with the CAPTCHA tests. In this example, the CAPTCHA controller 110 may stop initiating CAPTCHA tests for the identified source computing device (i.e., client computer) on a permanently basis, for a specified amount of time, or until some other user-defined condition(s) is satisfied.

Figure 5:
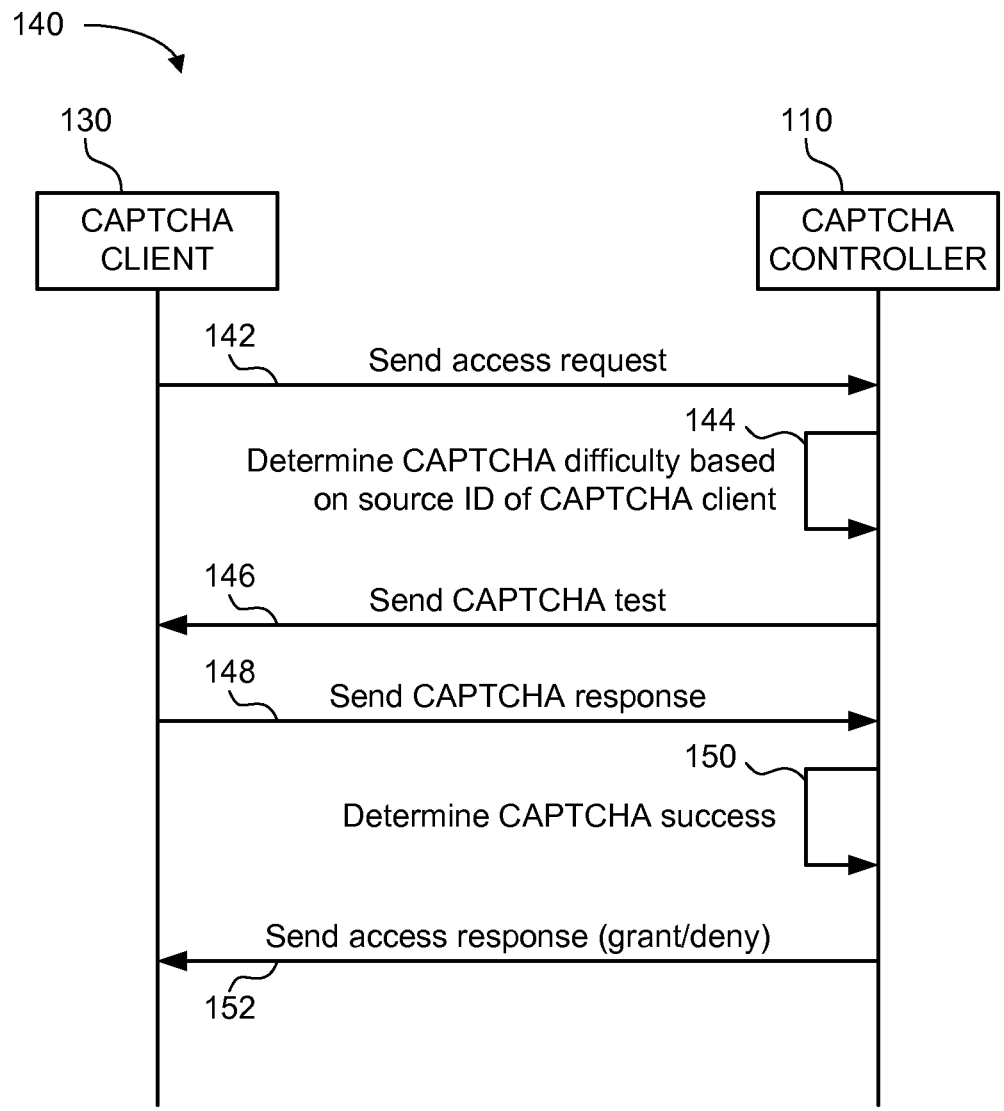
FIG. 5 depicts one embodiment of process flow diagram of communications between the CAPTCHA client and the CAPTCHA server of the data access system of FIG. 1.

FIG. 5 depicts one embodiment of process flow diagram 140 of communications between the CAPTCHA client 130 and the CAPTCHA controller 110 of the data access system 100 of FIG. 1. In the illustrated embodiment, the CAPTCHA client 130 sends 142 an access request to the CAPTCHA controller 110. It should be noted that the access request does not have to be a specific communication directly to the CAPTCHA controller 110, but rather may be a different type of request that ultimately invokes a CAPTCHA testing process. For example, the CAPTCHA client 130 may indirectly initiate an access request by attempting to access data on a third party website which requires a successful CAPTCHA response from the CAPTCHA controller 110 prior to allowing the CAPTCHA client 130 to access to the website data.

Upon receiving the access request, the CAPTCHA controller 110 determines 144 the level of difficulty that should be implemented for the corresponding CAPTCHA client 130. As explained above, in one embodiment, the CAPTCHA controller 110 may invoke the spambot tester 116 to look at the source identifier of the CAPTCHA client 130, possibly in combination with other criteria such as previous access request timestamps, in order to make the determination as to which level of difficulty should be presented to the CAPTCHA client 130. The CAPTCHA controller 110 then sends 146 a CAPTCHA test of the determined level of difficulty to the CAPTCHA client 130.

After receiving the CAPTCHA test from the CAPTCHA controller 110, the CAPTCHA client 130 sends 148 a CAPTCHA response back to the CAPTCHA controller 110. The CAPTCHA controller 110 then determines 150 whether the CAPTCHA response is correct for the CAPTCHA test that was administered and sends 152 an access response to the CAPTCHA client 130. The access response indicates whether or not the CAPTCHA client 130 is approved to access the requested data. Typically, if the CAPTCHA response is correct, then the CAPTCHA client 130 is granted access to the requested data. However, if the CAPTCHA response is incorrect, then the CAPTCHA client 130 is denied access to the requested data. The depicted process flow diagram 140 then ends, although communications between the CAPTCHA client 130 and the CAPTCHA controller 110 may continue in a similar manner as described above.

Figure 6:
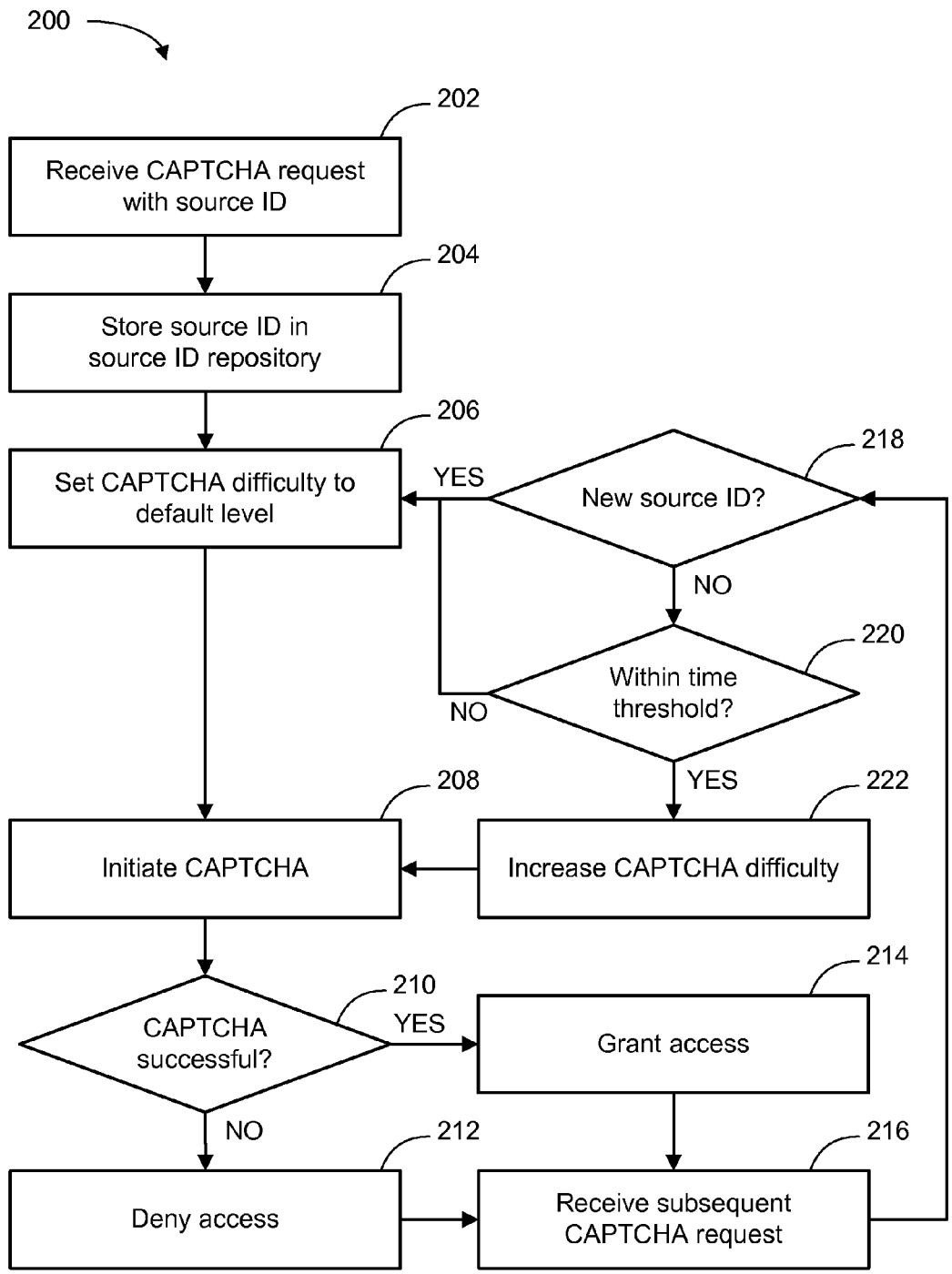
FIG. 6 depicts a flowchart diagram of one embodiment of a method for implementing graduated CAPTCHA difficulty within the data access system of FIG. 1.

FIG. 6 depicts a flowchart diagram of one embodiment of a method 200 for implementing graduated CAPTCHA difficulty within the data access system 100 of FIG. 1. In particular, the method 200 is presented from the operating perspective of the CAPTCHA controller 110. With the benefit of this disclosure, complementary methods may be implemented from the operating perspective of the CAPTCHA client 130 or a third party device coupled to the network 106. Although the method 200 is described in conjunction with the CAPTCHA client 130 and the CAPTCHA controller 110 of the data access system 100 of FIG. 1, embodiments of the method 200 may be implemented with other types of CAPTCHA clients, CAPTCHA controllers, and/or data access systems.

In general, the illustrated method 200 is a method for implementing graduated CAPTCHA difficulty within the data access system 100. The method 200 generally includes initiating a first CAPTCHA test with a designated level of difficulty at a source computing device in response to a first CAPTCHA request. The source computing device is identifiable by at least one source characteristic. The method 200 generally also includes recognizing a second CAPTCHA request from the same source computing device based on identification of the source characteristic. The method 200 generally also includes selecting a second CAPTCHA test having an increased level of difficulty relative to the level of difficulty of the first CAPTCHA test in response to recognizing the second CAPTCHA request is from the same source computing device. The method 200 generally also includes implementing the second CAPTCHA test having the increased level of difficulty at the same source computing device. More specific details of the illustrated method 200 are provided below.

In the illustrated method 200, the CAPTCHA controller 110 receives 202 a CAPTCHA request from the CAPTCHA client 130. The CAPTCHA request includes or is otherwise associated with a source identifier to identify the CAPTCHA client 130 as the source computing device. The CAPTCHA controller 110 then stores 204 the source identifier in the source identifier database 122 on the source identifier repository. Since this is the first CAPTCHA request from the CAPTCHA client 130, the CAPTCHA controller 110 sets 206 the level of difficulty for the CAPTCHA test to a default level of difficulty. The CAPTCHA controller 110 then initiates 208 the CAPTCHA test, through communication and coordination with the CAPTCHA client 130 on the client computer 102.

Upon receiving a response from the CAPTCHA client 130, the CAPTCHA controller 110 determines 210 whether or not the CAPTCHA client 130 provided a successful response to the CAPTCHA test. If the CAPTCHA response is incorrect, then the CAPTCHA controller 110 denies 212 the requested access. In contrast, if the CAPTCHA response is correct, then the CAPTCHA controller 110 grants 214 the requested access.

Up to this point (i.e., during the first access request from the CAPTCHA client 130), the CAPTCHA controller 110 does not necessarily attempt to determine whether or not the CAPTCHA client 130 is under the control of a real person or a spambot. However, once the CAPTCHA controller 110 receives 216 a subsequent CAPTCHA request, the CAPTCHA controller 110 begins to assess the status of the CAPTCHA client 130 to determine whether the CAPTCHA client 130 is operated by a real person or a spambot. In particular, the CAPTCHA controller 110 determines 218 whether the new CAPTCHA request corresponds to the same source identifier of the identified CAPTCHA client 130 (from the previous request) or from a different CAPTCHA client 130 having a different source identifier. If the CAPTCHA controller 110 identifies the CAPTCHA request as being from a different source computing device (i.e., CAPTCHA client 130) having a different source identifier, then the CAPTCHA controller 110 returns to set 206 the level of difficulty for the CAPTCHA test to a default level of difficulty and continues as described above.

However, if the CAPTCHA controller 110 identifies the CAPTCHA request as being from the same source computing device (i.e., CAPTCHA client 130) having the same source identifier, then the CAPTCHA controller 110 proceeds to determine 220 whether the subsequent CAPTCHA request occurs within a threshold time duration since the previous CAPTCHA request from the same CAPTCHA client 130. In the illustrated embodiment, if the subsequent CAPTCHA request occurs after expiration of the threshold time duration, then the CAPTCHA controller 110 returns to set 206 the level of difficulty for the CAPTCHA test to a default level of difficulty and continues as described above. In contrast, if the subsequent CAPTCHA request occurs before expiration of the threshold time duration, then the CAPTCHA controller 110 increases 222 the CAPTCHA difficulty to the higher level of difficulty and proceeds initiate the CAPTCHA test at the higher level of difficulty. In this way, the CAPTCHA controller 110 increases the level of difficulty of sequential CAPTCHA tests if consecutive CAPTCHA requests meet the criteria used to identify a spambot. In this case, the criteria are 1) receiving a subsequent request from the same source computing device, and 2) receiving the subsequent request within the threshold time duration. However, as explained above, other embodiments may use other criteria to make a determination as to whether the CAPTCHA client 130 is under the control of a real person or a spambot. The depicted method 200 then ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of a combination of hardware and software elements. In one embodiment, the invention is implemented in an electronic storage device containing software, which includes but is not limited to firmware, resident software, microcode, etc. Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can contain or store the program for use by or in connection with the instruction execution system, apparatus, or device. Further, the computer-usable or computer-readable storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In a specific embodiment, the computer program product includes a computer usable storage medium to store a computer readable program that, when executed on a computer, causes the computer to implement graduated CAPTCHA difficulty, as described herein. In one embodiment, the operations include initiating a first CAPTCHA test with a designated level of difficulty at a source computing device in response to a first CAPTCHA request. The first CAPTCHA request is associated with a first source identifier to identify at least one characteristic of the source computing device. The operations also include recognizing a second CAPTCHA request subsequent to the first CAPTCHA request. The second CAPTCHA request is associated with a second source identifier. The operations also include initiating a second CAPTCHA test in response to the second CAPTCHA request. The second CAPTCHA test has a level of difficulty which is dependent on a determination whether the first and second source identifiers correspond to the same source computing device.

In another embodiment, the first CAPTCHA test is associated with a first difficulty identifier indicative of a first level of difficulty, and the second CAPTCHA test is associated with a second difficulty identifier indicative of a second level of difficulty. The second level of difficulty is more difficult than the first level of difficulty in response to the determination that the first and second source identifiers correspond to the same source computing device. In another embodiment, the operation to initiate the second CAPTCHA test with the second level of difficulty is further conditioned on a determination that the second CAPTCHA request occurs within a threshold time duration between the first CAPTCHA test and the second CAPTCHA request. In some embodiments, the first and second source identifiers are device addresses such as IP addresses. In another embodiment, the operations also include storing the first source identifier in a search identification repository on an electronic storage device in response to implementation of the first CAPTCHA test. In another embodiment, the operations also include using the second source identifier to search the search identification repository to determine whether the second source identifier of the second CAPTCHA request matches the first source identifier of the first CAPTCHA request.

In another embodiment, the operations also include selecting the second CAPTCHA test from a plurality of CAPTCHA tests stored on an electronic storage device. Each of the plurality of CAPTCHA tests stored on the electronic storage device has a corresponding level of difficulty. In another embodiment, the operations also include, for each of the plurality of CAPTCHA tests stored on the electronic storage device, storing the corresponding level of difficulty, which is derived from statistical data for each of the plurality of CAPTCHA tests, and selecting the second CAPTCHA test based on the corresponding level of difficulty associated with the second CAPTCHA test. In another embodiment, the operations also include generating the second CAPTCHA test on demand with an estimated level of difficulty in response to the second CAPTCHA request and the determination whether the first and second source identifiers correspond to the same source computing device. Other embodiments of the computer program product may implement fewer or more instructions according to the functionality described herein.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program for implementing graduated difficulty for a human response test to differentiate between a human response and a computer response, wherein the computer readable program, when executed on a computer, causes the computer to perform operations comprising:
   initiating a first human response test with a designated level of difficulty at a source computing device in response to a first test request, wherein the first test request comprises a first source identifier to identify at least one characteristic of the source computing device;
   recognizing a second test request subsequent to the first test request, wherein the second test request comprises a second source identifier, wherein the second test request occurs after receiving a correct response to the first human response test and after granting requested access of the first test request;
   initiating a second human response test in response to the second test request, wherein the second human response test has a level of difficulty which is dependent on a determination whether the first and second source identifiers correspond to the same source computing device; and
   wherein the first human response test is associated with a first difficulty identifier indicative of a first level of difficulty, and the second human response test is associated with a second difficulty identifier indicative of a second level of difficulty, wherein the second level of difficulty is more difficult than the first level of difficulty in response to the determination that the first and second source identifiers correspond to the same source computing device.

2. The computer program product of claim 1, wherein the operation to initiate the second human response test with the second level of difficulty is further conditioned on a determination that the second test request occurs within a threshold time duration between the first human response test and the second test request.

3. The computer program product of claim 1, wherein the first and second source identifiers comprise internet protocol (IP) addresses.

4. The computer program product of claim 1, wherein the first and second human response tests comprise CAPTCHA tests.

5. The computer program product of claim 1, wherein the computer readable program, when executed on the computer, causes the computer to perform further operations comprising storing the first source identifier in a search identification repository on an electronic storage device in response to implementation of the first human response test.

6. The computer program product of claim 5, wherein the computer readable program, when executed on the computer, causes the computer to perform further operations comprising using the second source identifier to search the search identification repository to determine whether the second source identifier of the second test request matches the first source identifier of the first test request.

7. The computer program product of claim 1, wherein the computer readable program, when executed on the computer, causes the computer to perform further operations comprising selecting the second human response test from a plurality of human response tests stored on an electronic storage device, wherein each of the plurality of human response tests stored on the electronic storage device has a corresponding level of difficulty.

8. The computer program product of claim 7, wherein the computer readable program, when executed on the computer, causes the computer to perform further operations comprising:
   for each of the plurality of human response tests stored on the electronic storage device, storing the corresponding level of difficulty, wherein the corresponding level of difficulty is derived from statistical data for each of the plurality of human response tests; and
   selecting the second human response test based on the corresponding level of difficulty associated with the second human response test.

9. The computer program product of claim 1, wherein the computer readable program, when executed on the computer, causes the computer to perform further operations comprising generating the second human response test on demand with an estimated level of difficulty in response to the second test request and the determination whether the first and second source identifiers correspond to the same source computing device.

10. A server comprising:
   a network interface to connect the server to a network and to facilitate electronic communications between the server and a client computer coupled to the network; and
   a test controller coupled to the network interface, wherein the test controller is configured to implement a human response test with a level of difficulty on the client computer in response to an access request by the client computer, wherein the level of difficulty of the human response test is dependent on a determination whether the access request is deemed to originate from a spam-bot, wherein the human response test occurs after receiving a correct response from a prior human response test from the client computer and after granting requested access of the prior human response test; and
   wherein the prior human response test is associated with a first difficulty identifier indicative of a first level of difficulty, and the human response test is associated with a second difficulty identifier indicative of a second level of difficulty, wherein the second level of difficulty is more difficult than the first level of difficulty in response to a determination that a first source identifier corresponding to the prior human response test and a second source identifier corresponding to the human response test correspond to a same source computing device.

11. The server of claim 10, wherein the test controller comprises a spambot tester to determine whether the access request from the client computer originates from the spambot, wherein the spambot tester is configured to compare a source identifier associated with the access request with stored source identifiers associated with previous access requests, and to identify the client computer as a spambot in response to determining that the source identifier associated with the access request matches one of the stored source identifiers.

12. The server of claim 11, wherein the spambot tester comprises an algorithm stored on a computer readable storage medium, and the spambot tester is further configured to implement the algorithm to determine whether the access request from the client computer occurs within a threshold time duration from a previous access request from the same client computer.

13. The server of claim 12, further comprising a source identification repository coupled to the test controller, wherein the source identification repository is configured to store the source identifier associated with the access request from the client computer and the source identifiers associated with the previous access requests, as well as access requests timestamps corresponding to each of the stored source identifiers.

14. The server of claim 10, further comprising a test repository coupled to the test controller, wherein the test repository is configured to store a plurality of human response tests and a corresponding plurality of difficulty indicators to indicate a level of difficulty for each of the stored human response tests.

15. The server of claim 10, wherein the test controller is further configured to generate the human response test with the level of difficulty for implementation on the client computer in response to the access request by the client computer.

16. A method comprising:
initiating a first human response test with a designated level of difficulty at a source computing device in response to a first test request, wherein the source computing device is identifiable by at least one source characteristic;
recognizing a second test request from the same source computing device based on identification of the source characteristic, wherein the second test request occurs after receiving a correct response to the first human response test and after granting requested access of the first test request;
selecting a second human response test having an increased level of difficulty relative to the level of difficulty of the first human response test in response to recognizing the second test request is from the same source computing device;
implementing the second human response test having the increased level of difficulty at the same source computing device; and
wherein the first human response test is associated with a first difficulty identifier indicative of a first level of difficulty, and the second human response test is associated with a second difficulty identifier indicative of a second level of difficulty, wherein the second level of difficulty is more difficult than the first level of difficulty in response to the determination that the source characteristics correspond to the same source computing device.

17. The method of claim 16, further comprising determining whether the second test request occurs within a threshold time duration from the first human response test as a precondition prior to implementing the second human response test with the increased level of difficulty.

18. The method of claim 16, further comprising determining whether a result of the first human response test is successful as a precondition prior to implementing the second human response test with the increased level of difficulty.

19. The method of claim 16, further comprising:
storing the source characteristic of the source computing device in a search identification repository on an electronic storage device; and
storing a plurality of human response tests and corresponding difficulty indicators in a test repository on the electronic storage device.

* * * * *